Oct. 26, 1954     N. PELOSI     2,692,699
CONTAINER WITH FREE TEARING STRIP TONGUE
Filed April 4, 1951
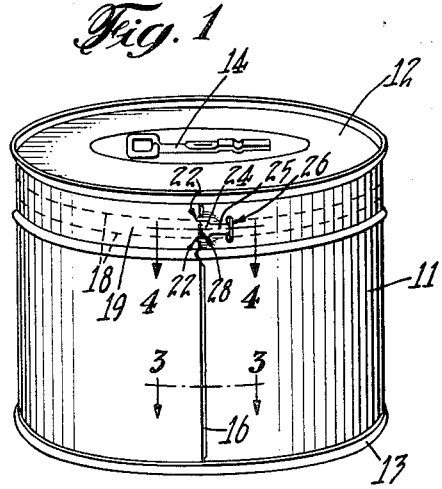
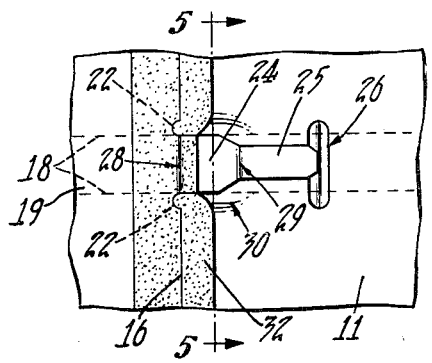
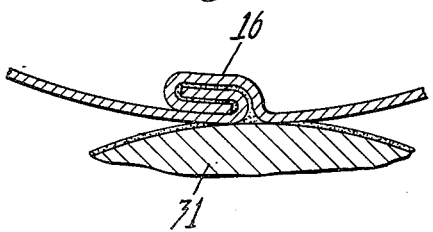
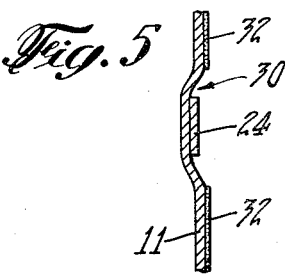
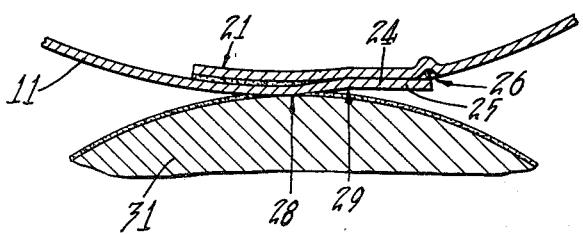
INVENTOR.
NICHOLAS PELOSI
BY *Charles H. Erne*
*Ivan D. Thornburgh*
ATTORNEYS Patented Oct. 26, 1954

2,692,699

UNITED STATES PATENT OFFICE 2,692,699

CONTAINER WITH FREE TEARING STRIP TONGUE

Nicholas Pelosi, Newark, N. J., assignor to American Can Company, New York, N. Y., a corporation of New Jersey Application April 4, 1951, Serial No. 219,201

1 Claim. (Cl. 220—54)

The present invention relates to a container having a tearing strip formed with a projecting tongue adapted to be engaged by a key or other instrument for removing the strip to open the container and has particular reference to a tongue having its base adjacent the side seam of the container depressed or spaced away from the solder roll to prevent soldering of the tongue to the container side wall.

In the manufacture of tearing strip containers or cans, the tearing strip at the side seam of the container usually is provided with a tongue which projects beyond the side seam and lies flat against the exterior side wall of the container until used for opening the can. When it is desired to open the can, the tongue is bent outwardly to engage the slot of a key over the tongue to remove the tearing strip.

Such cans usually are made with the well known lock and lap side seams to which solder is applied from the exterior surface of the cans by a rotating solder roll to render the seams hermetic. The major portions of the seams are formed with interlocked hooks which are soldered together. At the tearing strip, the side seam is merely lapped and the soldering operation solders or sweats these laps together to make this portion of the seam hermetic. In soldering this tearing strip lapped section capillary action sometimes causes the solder to spread outwardly under the tongue and thus solder the tongue to the side wall of the can body so that the tongue cannot be lifted to apply the key to it for opening the can.

The instant invention contemplates overcoming this difficulty by depressing the tongue and the adjacent body wall to space the tongue away from the solder roll so that the solder cut, i. e. the width of the strip of solder applied to the outside of the can by the roll, will be reduced at the tongue and thus the solder will be restrained from spreading under the tongue.

An object of the invention is the provision in a tearing strip can of a free tearing strip tongue wherein the base of the tongue adjacent the side seam of the can together with the adjacent body wall is pressed inwardly beyond the peripheral surface of the can body so that a solder roll in applying the solder to the side seam in the usual manner will produce a reduced solder cut at the tongue thereby depositing at the base of the tongue just sufficient solder to seal the lapped joint at the base of the tongue but insufficient solder to cause soldering of the tongue to the can, thus leaving the tongue free to facilitate application of the opening key thereto and initial tearing of the strip.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a tearing strip container embodying the instant invention;

Fig. 2 is an enlarged schematic view of the tongue portion of the can shown in Fig. 1, the view showing the solder cut as applied to the side seam adjacent and through this tongue portion;

Fig. 3 is an enlarged sectional view through the lock portion of the side seam of the can as taken substantially along a plane indicated by the lines 3—3 in Fig. 1, the view also showing a fragmentary portion of a solder roll as an incident to applying the solder to the seam;

Fig. 4 is a view similar to Fig. 3 and taken through the tongue portion of the can at the lap section of the seam substantially along a plane indicated by the lines 4—4 in Fig. 1, the view also showing a fragmentary portion of the soldering roll; and Fig. 5 is an enlarged sectional view taken substantially along the line 5—5 in Fig. 2.

As a preferred or exemplary embodiment of the invention the drawings illustrate a cylindrical sheet metal container or can comprising a body 11 having top and bottom end members 12, 13 respectively secured thereto in suitable seams such as the well known double seam or joint. A key 14 is secured to the top end member 12 in any suitable manner for use in opening the can.

The can body 11 preferably is of the character made from a single blank of material having its end edge portions united in a lock and lap type side seam 16 in which the major portion of the seam is provided with interlocked hooks tightly squeezed together as best shown in Fig. 3. Adjacent the top end member 12, the can body 11 is provided with a pair of spaced and parallel score lines 18 which completely encircle the body and which set off between them a removable tearing strip 19. At the side seam 16 the terminal ends of the tearing strip portions of the can body overlap to provide a lap portion 21 (Fig. 4) of the side seam.

At the side seam 16 the score lines 18 in the outer lap portion of the body terminate in notches 22 (Figs. 1 and 2) and the tearing strip 19 merges into a continuing tongue 24 which lies flat against the adjacent outer surface of the can body. This tongue preferably, at its outer end, tapers into a narrower tongue section 25 adapted to fit a slot in a conventional opening key 14. Adjacent the outer end of the tongue section 25 the can body wall preferably is formed with a transverse depression 26 to facilitate lifting the tongue to apply the key 14 thereto.

The base of the tongue 24 is disposed adjacent the notches 22 where the tongue merges with the tearing strip 19. At this base, the tongue 24 across its entire width and the adjacent side wall of the body 11 along a width substantially greater than the width of the tongue, are bent, offset or depressed inwardly along a line of bend 28 (Figs. 1 and 4) which is parallel with and in line with the lock portion of the can body side seam 16. From this line of bend 28, the tongue 24 and the adjacent body side wall slope inwardly toward a second or auxiliary return line of bend 29 and then slope outwardly, the body side wall merging into the wall of the can body at the depression 26 and the tongue terminating at the depression. Thus the base of the tongue at the bend 28 is flush with the side seam 16 and the tongue extending beyond this line of bend is depressed inwardly of the seam into a recess 30 extending from the side seam to beyond the area of subsequent solder application and formed as a result of the bending of the wall of the body when the tongue is bent inwardly.

When the side seam 16 is soldered in the usual manner, the can body is advanced endwise along and with its side seam in contact with a rotating solder roll 31 (Figs. 3 and 4) rotating in a bath of molten solder. The solder carried up by the roll is wiped into the seam where it creeps by capillary attraction into the interstices between the interlocked hooked edges of the seam as in Fig. 3. This soldering operation produces a solder stripe 32 along the length of the side seam and extending laterally beyond the seam along a parallel strip of the body wall. The width or cut of this stripe is substantially uniform throughout its length, but at the base of the tongue 24, the solder stripe is "scalloped," reduced or narrowed as shown in Fig. 2 because of the body recess 30 and the receding or inwardly sloping tongue portion extending into the recess from the line of bend 28. The amount of solder thus applied at the base of the tongue is therefore reduced and the solder which is applied is swept or forced inwardly toward the notches 22 where it creeps by capillary attraction into the lap portion of the seam at the base of the tongue. Due to this scalloping action the amount of solder applied at this point is just sufficient to fully solder the lap portion of the seam. Hence the solder is restrained from creeping along the tongue and thus the tongue remains substantially unsoldered and free against the body side wall for easy outward bending to apply the key 14 thereto when it is desired to open the can.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

A sheet metal container, comprising a body having a multiple layer side seam bonded with solder applied across and along the outer layers of the seam in a stripe of predetermined width, a tearing strip defined by a pair of spaced score lines encircling said body, said tearing strip terminating in a tongue which is substantially flat throughout its area and projects at its base from said side seam and extends over said body to beyond the adjacent outer edge of said solder stripe, said stripe being reduced in width at said base of the tongue, said body under said tongue being formed with a recess depressed inwardly to a depth greater than the thickness of the tongue and for a width substantially greater than the width of the tongue to provide substantial clearance spaces on each side of the tongue, said tongue for its full width and to a depth greater than its thickness being depressed into said recess, said recess extending from within the edge of said solder stripe to beyond the outer edge of said stripe, whereby the width of the solder stripe adjacent the base of said tongue is reduced by said wide clearance spaces and said depression of the tongue to limit application of solder to only that portion of said tongue immediately adjacent to said side seam.

References Cited in the file of this patent
UNITED STATES PATENTS

| Number | Name | Date |
|---|---|---|
| 859,297 | Hurley | July 9, 1907 |
| 1,582,956 | Young | May 4, 1926 |
| 2,153,344 | Selliken | Apr. 4, 1939 |
| 2,181,339 | Pearson | Nov. 28, 1939 |